United States Patent
Fukada

(10) Patent No.: US 7,624,011 B2
(45) Date of Patent: Nov. 24, 2009

(54) SPEECH RECOGNITION METHOD COMPUTER READABLE MEDIUM AND APPARATUS FOR RECOGNIZING GEOGRAPHICAL NAMES USING WEIGHT INFORMATION

(75) Inventor: Toshiaki Fukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 11/006,628

(22) Filed: Dec. 8, 2004

(65) Prior Publication Data

US 2005/0131699 A1 Jun. 16, 2005

(30) Foreign Application Priority Data

Dec. 12, 2003 (JP) ............................ 2003-415425

(51) Int. Cl.
*G10L 15/14* (2006.01)
*G10L 15/22* (2006.01)
(52) U.S. Cl. .................. 704/240; 704/275; 701/200
(58) Field of Classification Search ................ 704/240; 340/426.19
See application file for complete search history.

(56) References Cited

U.S. PATENT DOCUMENTS

| | | | |
|---|---|---|---|
| 5,479,488 A * | 12/1995 | Lennig et al. | 379/88.04 |
| 5,524,169 A * | 6/1996 | Cohen et al. | 704/231 |
| 5,995,894 A * | 11/1999 | Wendte | 701/50 |
| 6,112,174 A * | 8/2000 | Wakisaka et al. | 704/251 |
| 6,122,361 A * | 9/2000 | Gupta | 379/223 |
| 6,483,896 B1 * | 11/2002 | Goldberg et al. | 379/88.01 |
| 6,907,436 B2 * | 6/2005 | Ye et al. | 707/203 |
| 6,978,237 B2 * | 12/2005 | Tachimori et al. | 704/238 |
| 7,184,957 B2 * | 2/2007 | Brookes et al. | 704/246 |
| 2001/0053955 A1 * | 12/2001 | Shirai et al. | 701/200 |
| 2002/0072917 A1 * | 6/2002 | Irvin et al. | 704/270.1 |
| 2002/0111810 A1 * | 8/2002 | Khan et al. | 704/275 |
| 2004/0193603 A1 * | 9/2004 | Ljubicich | 707/9 |

FOREIGN PATENT DOCUMENTS

| | | |
|---|---|---|
| EP | 1 233 407 | 8/2002 |
| JP | 2907728 (B2) | 4/1999 |
| JP | 11-231889 (A) | 8/1999 |
| JP | 2001-13991 | 1/2001 |

\* cited by examiner

*Primary Examiner*—Talivaldis I Smits
*Assistant Examiner*—Jesse S Pullias
(74) *Attorney, Agent, or Firm*—Fitzpatrick, Cella, Harper & Scinto

(57) ABSTRACT

A speech recognition apparatus and method of this invention manage previously input frequencies of occurrence for respective geographical names to be recognized (202), update the probability of occurrence of the geographical name to be recognized of interest on the basis of the frequency of occurrence of that geographical name, and those of geographical names to be recognized located within a predetermined region including the position of the geographical name of interest using a table (114) that describes correspondence between the geographical names to be recognized and their positions, and perform this update process for respective geographical names to be recognized (203).

3 Claims, 17 Drawing Sheets

FIG. 4

| WORD ID | KANJI NOTATION | PRONUNCIATION | LANGUAGE LIKELIHOOD |
|---|---|---|---|
| 1 | 横浜 | yokohama | L(1) |
| 2 | 渋谷 | shibuya | L(2) |
| 3 | 日吉 | hiyoshi | L(3) |
| 4 | 桜木町 | sakuragicho | L(4) |
| 5 | 反町 | tanmachi | L(5) |
| 6 | 下丸子 | shimomaruko | L(6) |
| | | | |

FIG. 5

| WORD ID | LONGITUDE | LATITUDE | FREQUENCY OF OCCURRENCE |
|---|---|---|---|
| 1 | $X_1$ | $Y_1$ | $N_1$ |
| 2 | $X_2$ | $Y_2$ | $N_2$ |
| 3 | $X_3$ | $Y_3$ | $N_3$ |
| 4 | $X_4$ | $Y_4$ | $N_4$ |
| 5 | $X_5$ | $Y_5$ | $N_5$ |
| 6 | $X_6$ | $Y_6$ | $N_6$ |
| ... | ... | ... | ... |

FIG. 12

| WORD ID | KANJI NOTATION | PRONUNCIATION | LANGUAGE LIKELIHOOD 1 | LANGUAGE LIKELIHOOD 2 |
|---|---|---|---|---|
| 1 | 横浜 | yokohama | $L_1(1)$ | $L_2(1)$ |
| 2 | 渋谷 | shibuya | $L_1(2)$ | $L_2(2)$ |
| 3 | 日吉 | hiyoshi | $L_1(3)$ | $L_2(3)$ |
| 4 | 桜木町 | sakuragicho | $L_1(4)$ | $L_2(4)$ |
| 5 | 反町 | tanmachi | $L_1(5)$ | $L_2(5)$ |
| 6 | 下丸子 | shimomaruko | $L_1(6)$ | $L_2(6)$ |
| ... | ... | ... | ... | ... |

FIG. 13

| WORD ID | LONGITUDE | LATITUDE | FREQUENCY OF OCCURRENCE 1 | FREQUENCY OF OCCURRENCE 2 |
|---|---|---|---|---|
| 1 | $X_1$ | $Y_1$ | $N_{11}$ | $N_{21}$ |
| 2 | $X_2$ | $Y_2$ | $N_{12}$ | $N_{22}$ |
| 3 | $X_3$ | $Y_3$ | $N_{13}$ | $N_{23}$ |
| 4 | $X_4$ | $Y_4$ | $N_{14}$ | $N_{24}$ |
| 5 | $X_5$ | $Y_5$ | $N_{15}$ | $N_{25}$ |
| 6 | $X_6$ | $Y_6$ | $N_{16}$ | $N_{26}$ |
| ... | ... | ... | ... | ... |

FIG. 14

| WORD ID | NUMBER OF SURROUNDING WORDS | SURROUNDING WORD ID | | | |
|---|---|---|---|---|---|
| 1 | 3 | 2 | 5 | 7 | |
| 2 | 1 | 1 | | | |
| 3 | 6 | 6 | 9 | 12 | ... |
| 4 | 0 | | | | |
| 5 | 2 | 1 | 6 | | |
| 6 | 2 | 3 | 5 | | |
| ... | ... | ... | ... | ... | ... |

FIG. 15

| WORD ID | NUMBER OF SURROUNDING WORDS | SURROUNDING WORD ID, DISTANCE | | | |
|---|---|---|---|---|---|
| 1 | 3 | 2, 3.0 | 5, 2.5 | 7, 4.0 | |
| 2 | 1 | 1, 3.0 | | | |
| 3 | 6 | 6, 4.0 | 9, 2.0 | 12, 4.0 | ... |
| 4 | 0 | | | | |
| 5 | 2 | 1, 2.5 | 6, 3.0 | | |
| 6 | 2 | 3, 4.0 | 5, 3.0 | | |
| ... | ... | ... | ... | ... | ... |

FIG. 16

| WORD ID | 1 | 2 | 3 | 4 | 5 | 6 | ... |
|---|---|---|---|---|---|---|---|
| 1 | $d_{11}$ | $d_{12}$ | $d_{13}$ | $d_{14}$ | $d_{15}$ | $d_{16}$ | ... |
| 2 | $d_{21}$ | $d_{22}$ | $d_{23}$ | $d_{24}$ | $d_{25}$ | $d_{26}$ | ... |
| 3 | $d_{31}$ | $d_{32}$ | $d_{33}$ | $d_{34}$ | $d_{35}$ | $d_{36}$ | ... |
| 4 | $d_{41}$ | $d_{42}$ | $d_{43}$ | $d_{44}$ | $d_{45}$ | $d_{46}$ | ... |
| 5 | $d_{51}$ | $d_{52}$ | $d_{53}$ | $d_{54}$ | $d_{55}$ | $d_{56}$ | ... |
| 6 | $d_{61}$ | $d_{62}$ | $d_{63}$ | $d_{64}$ | $d_{65}$ | $d_{66}$ | ... |
| ... | ... | ... | ... | ... | ... | ... | ... |

```
#NODE DEFINITION
W=1
W=2
W=3
W=4
W=5
W=6
W=7
W=8

#LINK DEFINITION
L=1      S=1      E=2      d=10.0
L=2      S=1      E=5      d=35.0
L=3      S=1      E=8      d=25.0
L=4      S=3      E=8      d=20.0
L=5      S=7      E=8      d=28.0
L=6      S=2      E=6      d=8.0
L=7      S=4      E=6      d=26.0
```

SPEECH RECOGNITION METHOD COMPUTER READABLE MEDIUM AND APPARATUS FOR RECOGNIZING GEOGRAPHICAL NAMES USING WEIGHT INFORMATION

FIELD OF THE INVENTION

The present invention relates to a speech recognition method and apparatus.

BACKGROUND OF THE INVENTION

Upon utilizing a search application of the Internet or in an information device such as a car navigation system, portable phone, or the like, information associated with a place such as a station name, landmark, address, or the like is often input. Speech recognition may be used to input such information. Now assuming an application which recognizes station names input by speech upon inputting departure and destination stations in association with a route guide of train. In this case, since all station names assumed by the application are used as objects to be inputs, around 10 thousand station names are lexical items which are to undergo speech recognition. The speech recognition performance of isolated words when several thousand or more lexical items are to be recognized in this way is not sufficient in the current speech recognition technique.

When each individual user uses such application, even when words to be recognized are nationwide ones, the area of the station names to be frequently input by the user are often relatively limited to those around his or her home or place of work. For example, if an utterance of the user who frequently inputs station names around Yokohama and Tokyo is recognized to have the same likelihood value as "谷町(Tanimachi)" or "反町(Tanmachi)", it is normally considered that "反町(Tanmachi)" in Yokohama is more probable than "谷町(Tanimachi)" in Osaka. That is, the speech recognition performance can be improved by utilizing information obtained from user's previous input history in current speech recognition.

By contrast, Japanese Patent Laid-Open No. 11-231889 discloses a method of correcting similarity data output from a speech recognition device in accordance with the distance from the current position where speech recognition is used, the name recognition of a landmark, or the like in recognition of a place name, landmark, and the like.

Also, Japanese Patent No. 2907728 discloses a method of calculating the frequencies of occurrence of an area where an automobile traveled previously, and an area of a destination, and calculating the recognition result in consideration of the frequencies of occurrence.

Japanese Patent Laid-Open No. 11-231889 above also discloses a method of directly utilizing the recognition history, but it does not mention about correction of similarity data around the recognition history. Hence, similarity data of place names around those which were input previously and place name of areas which were not input previously at all cannot be corrected.

Also, since the method disclosed in Japanese Patent No. 2907728 divides destinations as areas which do not overlap each other, an area with zero frequency of occurrence around the area where the automobile travels frequently and a plurality of areas where the automobile did not travel at all are equally handled.

SUMMARY OF THE INVENTION

The present invention has been made in consideration of the above problems, and has as its object to further improve the speech recognition performance using information of a recognition history and the like.

In order to achieve the above object, for example, a speech recognition method of the present invention comprises the following arrangement. That is, a method for performing speech recognition of geographical names using weight information associated with respective geographical names to be recognized, comprises a frequency-of-occurrence management step of managing previously input frequencies of occurrence for respective geographical names to be recognized, an extraction step of extracting geographical names to be recognized located within a region having a predetermined positional relationship with a position of the geographical name to be recognized of interest on the basis of a table that describes correspondence between geographical names to be recognized and their positions, and an update step of updating the weight information associated with the geographical name to be recognized of interest on the basis of the frequencies of occurrence of the extracted geographical names.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 4 shows an example of the structure of a speech recognition dictionary;

FIG. 5 shows an example of the structure of a position/frequency-of-occurrence table;

FIG. 11 is a block diagram showing the module configuration of a speech recognition program when the frequency of occurrence and weight information are updated using input means such as a keyboard, mouse, pen, or the like;

FIG. 12 shows an example of the structure of a speech recognition dictionary which holds two types of language likelihood data;

FIG. 13 shows an example of the structure of a position/frequency-of-occurrence table which holds two types of language likelihood data;

FIG. 14 shows an example of a surrounding word group table;

FIG. 15 shows an example of a surrounding word group table with distance information;

FIG. 16 shows an example of an inter-word distance table; and

DESCRIPTION OF THE PREFERRED EMBODIMENTS

Preferred embodiments of the present invention will now be described in detail in accordance with the accompanying drawings.

The present invention aims at improving the speech recognition performance on the basis of the aforementioned technical background. An embodiment of the present invention will explain a method of generating more appropriate probabilities of occurrence (unigram in case of isolated word recognition) not only for words/phases of an input history and those in an area but also for all words to be recognized in consideration of coordinate information (positions) of a word/phrase (e.g., place name) input as a previous history and its input frequency of occurrence upon recognizing input speech.

First Embodiment

A speech recognition apparatus of this embodiment relates to an apparatus which uses geographical names as objects to be recognized. For example, this embodiment relates to a train route guide application, which recognizes station names input as speech upon inputting a departure station and destination station.

Figure 1:
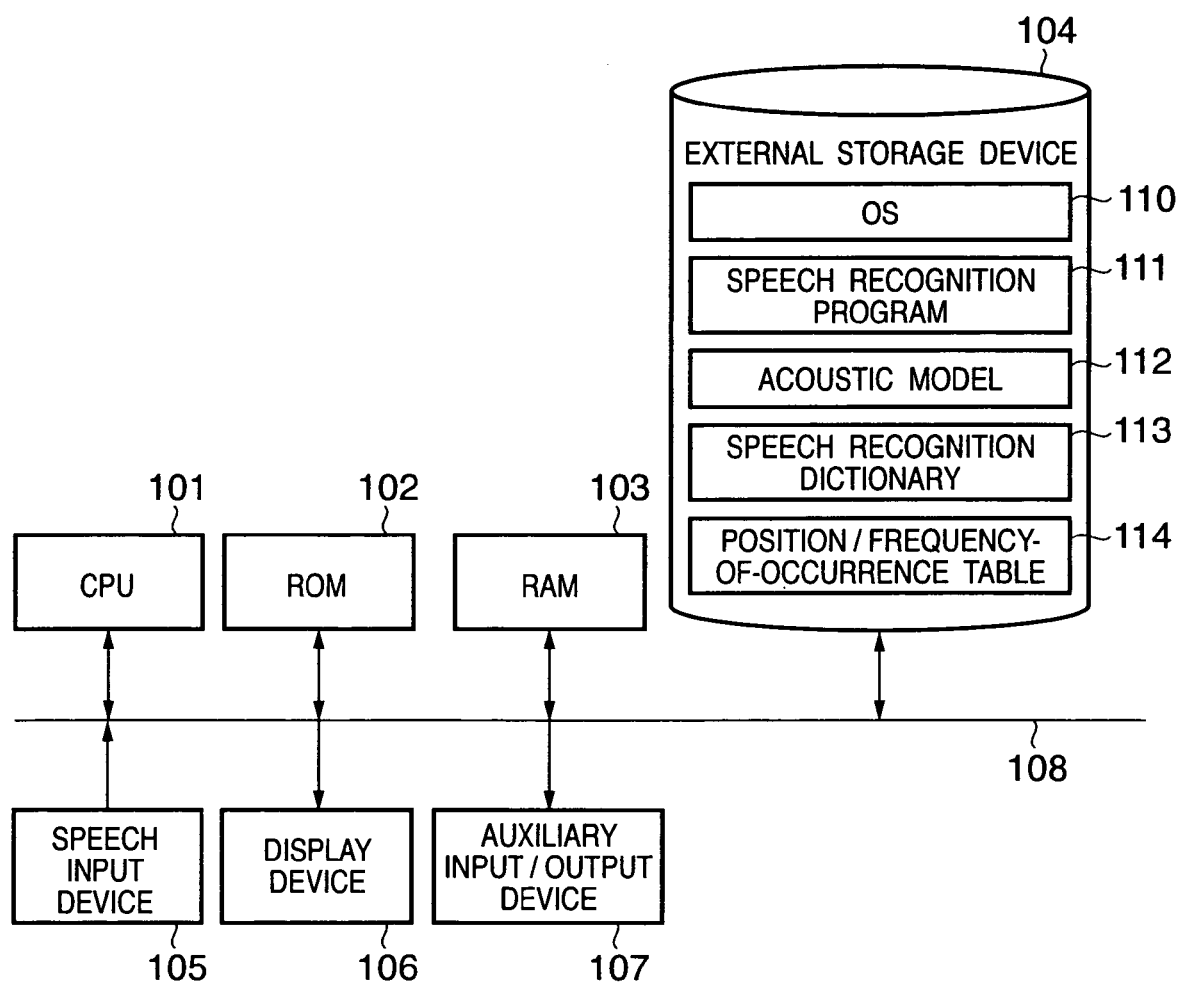
FIG. 1 is a block diagram showing the arrangement of a speech recognition apparatus according to an embodiment of the present invention.

FIG. 1 is a block diagram showing the arrangement of a speech recognition apparatus according to this embodiment. As shown in FIG. 1, this speech recognition apparatus comprises a CPU 101, ROM 102, RAM 103, and the like, and such arrangement can be typically implemented by a computer apparatus such as a personal computer or the like. Also, this apparatus may be formed by dedicated hardware logic in place of such general-purpose computer.

The CPU 101 controls the overall apparatus in accordance with control programs stored in the ROM 102 or various programs loaded from an external storage device 104 onto the RAM 103. The ROM 102 stores various parameters, control programs and the like to be executed by the CPU 101, and the like. The RAM 103 serves as a main storage device, provides a work area upon execution of various kinds of control by the CPU 101, and stores programs to be executed by the CPU 101.

The external storage device 104 (e.g., a hard disk drive or the like) stores a speech recognition program 111, acoustic model 112, speech recognition dictionary 113, and position/frequency-of-occurrence table 114 (to be described later) in addition to an OS 110, as shown in FIG. 1. Reference numeral 105 denotes a speech input device such as a microphone or the like, and speech recognition is applied to speech input by this device. Reference numeral 106 denotes a display device such as a CRT, liquid crystal display, or the like, which makes a display and output associated with setups and inputs of processing contents. Reference numeral 107 denotes an auxiliary input/output device such as a button, ten-key pad, keyboard, mouse, and the like. Reference numeral 108 denotes a bus which interconnects the respective units. Note that speech which is to undergo speech recognition may be input by the speech input device 105, or speech data acquired by another device may be stored in the RAM 103 or external storage device 104 via a network (not shown) and may be used as an object which is to undergo speech recognition.

Figure 2:
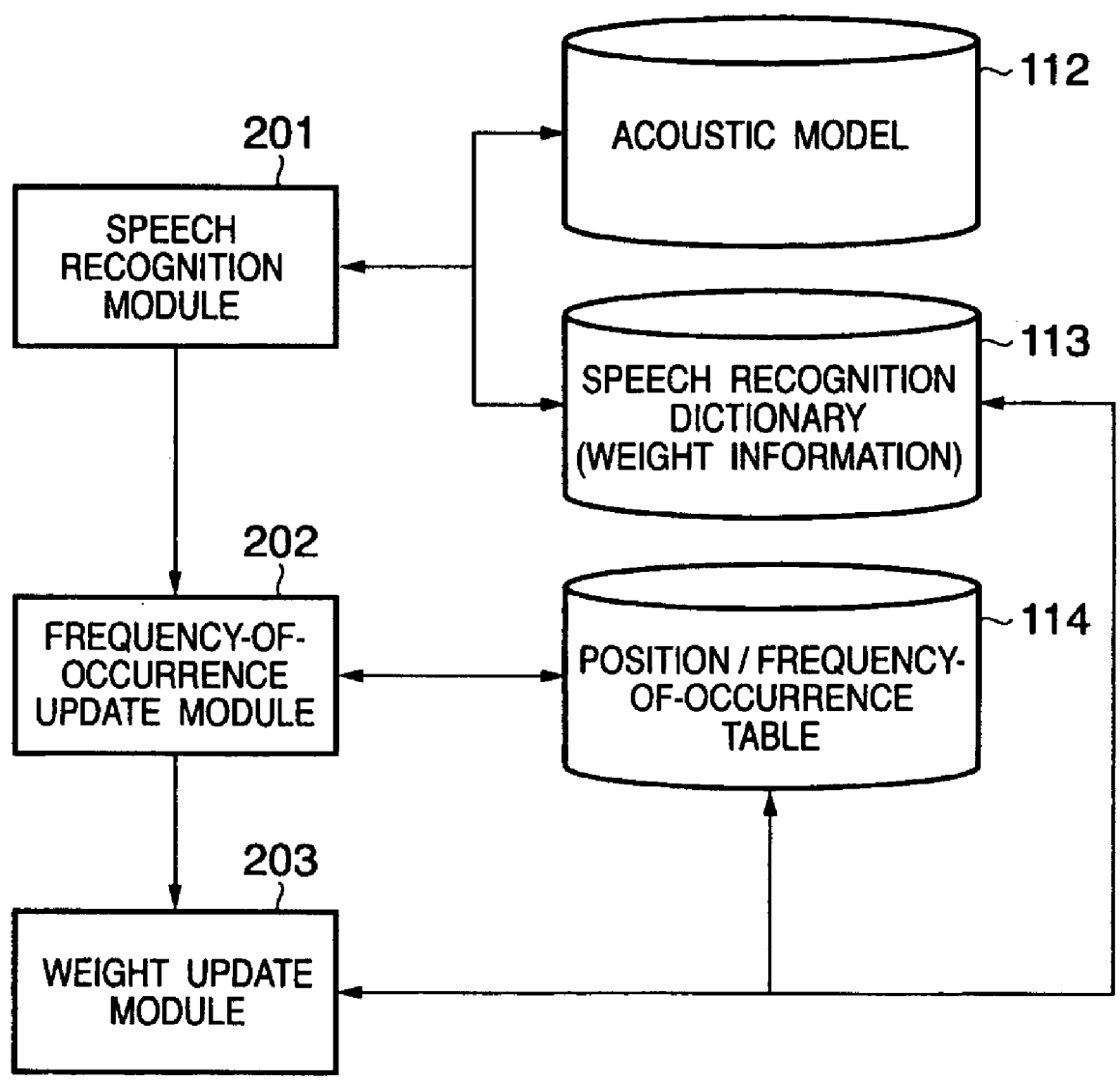
FIG. 2 is a block diagram showing the module configuration of a speech recognition program according to an embodiment of the present invention.

FIG. 2 is a block diagram showing the module configuration of the speech recognition program installed in the external storage device 104.

Reference numeral 201 denotes a speech recognition module which recognizes speech input by the speech input device 105 or the like. More specifically, the speech recognition module 105 analyzes input speech, makes distance calculations with reference patterns, retrieval process, recognition result output process, and the like. The speech recognition dictionary 113 holds information of word IDs, notations, pronunciations, and word weights associated with words to be recognized. The acoustic model 112 holds models of phonemes, syllables, words, and the like, which are formed of, e.g., Hidden Markov Models: HMMs. A reference pattern of a word to be recognized is formed using models in the acoustic model 112 in accordance with word information and pronunciation information in the speech recognition dictionary 113. Reference numeral 202 denotes a frequency-of-occurrence update module which updates frequency-of-occurrence information of words to be recognized using the speech recognition result of the speech recognition module 201. The position/frequency-of-occurrence table 114 holds information associated with the positions and frequencies of occurrence of words to be recognized. Reference numeral 203 denotes a weight update module which calculates the weights of words to be recognized on the basis of the position/frequency-of-occurrence table 114, and changes information associated with weights in the speech recognition dictionary 113.

Figure 3:
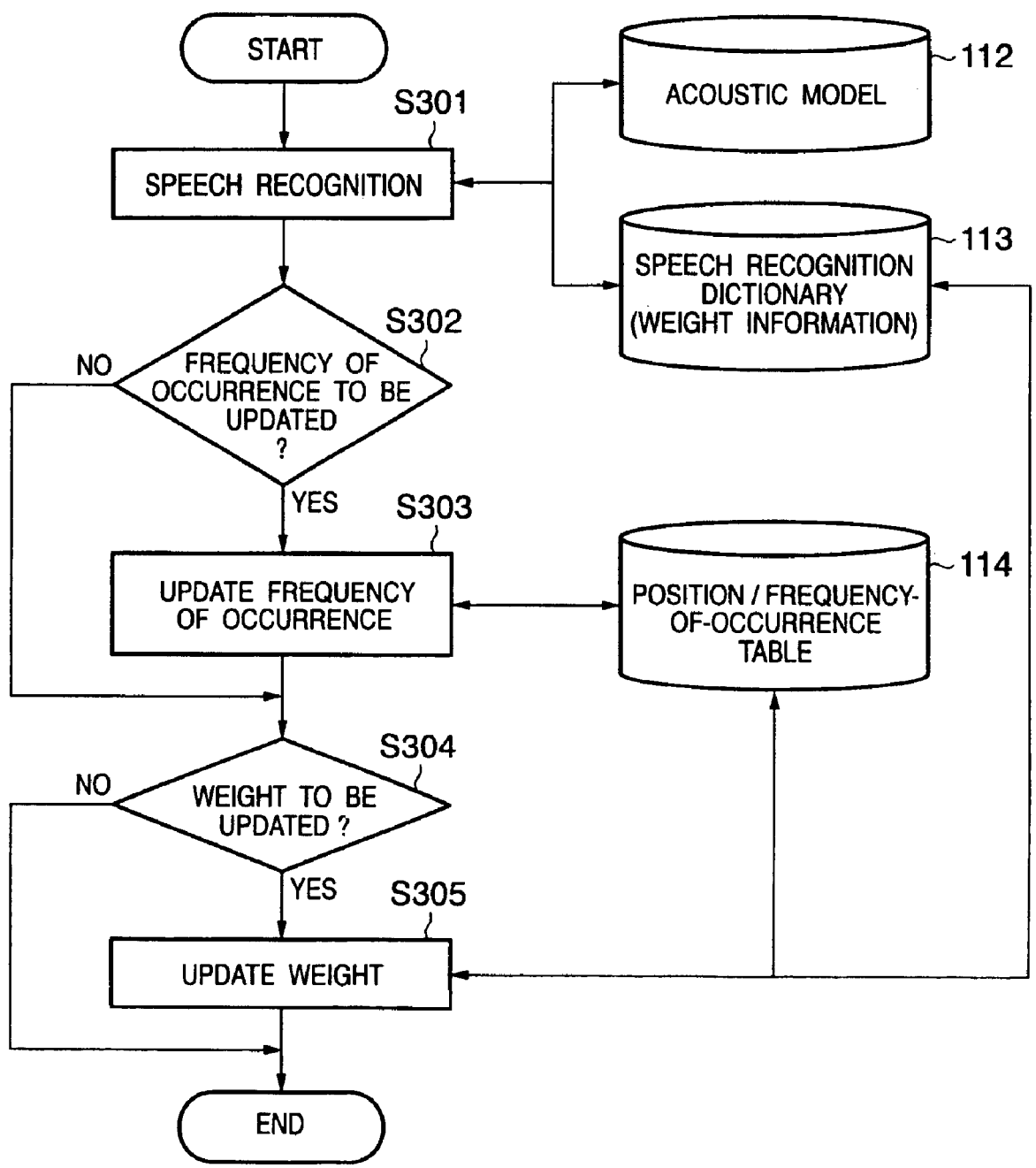
FIG. 3 is a flowchart showing a speech recognition process according to an embodiment of the present invention.

FIG. 3 is a flowchart showing an overview of the process by the speech recognition program 111 according to this embodiment.

In step S301, speech input from the speech input device 105 or the like is recognized. More specifically, feature amount analysis of input speech, distance calculations with reference patterns, a retrieval process, a recognition result output process, and the like are executed. These speech recognition processes are made based on the acoustic model 112 formed of, e.g., HMMs. Note that it is a common practice to set an identical probability of occurrence (weight) of respective words upon making isolated word speech recognition. However, in this embodiment, speech recognition is made by applying a language probability P to respective words, i.e., by applying different probabilities of occurrence to respective words. That is, let $L(x|k)$ be an acoustic likelihood (a score calculated as the distance between feature amount vector x of input speech and a reference pattern) of word k for input speech. Then, likelihood $L(k|x)$ of input speech for word k is given by $L(k|x)=L(x|k)+\alpha L(k)$ where $L(k)$ is a language likelihood calculated as $L(k)=\log P(k)$ from language probability $P(k)$ for word k, and $\alpha$ is a coefficient used to balance between the acoustic likelihood and language likelihood.

FIG. 4 shows an example of the structure of the speech recognition dictionary 113. In this example, the table 113 holds information associated with word IDs, notations, pronunciations using phonemic sequence expressions, and language likelihood values as probabilities of occurrence (to be also simply referred to as "weights" hereinafter) of words for respective words.

The acoustic model 112 holds models of phonemes, syllables, words, and the like, as described above. If this acoustic model holds models as phoneme HMMs, a reference pattern of each word is generated by coupling phoneme HMMs in accordance with pronunciation information expressed by a phonemic sequence in the speech recognition dictionary 113. The acoustic likelihood and language likelihood of input speech with respect to this reference pattern are calculated for all words to be recognized, and word k that maximizes the likelihood by:

$$\hat{k} = \underset{k \in K}{\mathrm{argmax}} L(k \mid x) \quad (1)$$

where argmax is a process for calculating k that maximizes L(k|x), and K is a set of words to be recognized is output as the first recognition result.

It is checked in step S302 if a frequency-of-occurrence update process by frequency-of-occurrence update module 202 is to be executed. As a criterion of judgment, if the first recognition result obtained in step S301 is settled by the user, it is determined that the frequency-of-occurrence update process is to be executed, and the flow advances to step S303; otherwise, it is determined that the frequency-of-occurrence update process is not executed, and the flow advances to step S304 while skipping step S303.

In step S303, the frequency-of-occurrence information held by the position/frequency-of-occurrence table 114 is updated. FIG. 5 shows an example of the structure of the position/frequency-of-occurrence table 114. In this example, the table 114 holds word IDs, positions such as latitudes, longitudes, and the like (geographical position information), and frequency-of-occurrence information indicating the number of times of previous recognition outputs of each word in correspondence with geographical names as words to be recognized. Note that the latitudes and longitudes are calculated in advance as information associated with the positions of respective words. For example, the position information of the Yokohama station is expressed by Lat. 35° 27' 58" N and Long. 139° 37' 21" E, that of the Shibuya station is expressed by Lat. 35° 39' 32" N and Long. 139° 42' 4" E, and so forth. Also, the initial value of a frequency of occurrence is 1 for all words. If "Yokohama" with word ID=1 is settled, a value $N_1$ in the position/frequency-of-occurrence table 114 is incremented by 1 as the process in step S303.

In this manner, this position/frequency-of-occurrence table 114 defines the correspondence between the geographical name to be recognized and its position, and manages the frequency of occurrence of recognition outputs of each word. Of course, this table may have independent tables for positions and frequencies of occurrence.

It is checked in step S304 if a weight is to be updated. For example, if step S303 is executed since the first recognition result obtained in step S301 is settled by the user, and the frequency of occurrence in position/frequency-of-occurrence table 114 is updated, the flow advances to step S305; otherwise, step S305 is skipped, thus ending the process.

In step S305, the weight of each word is calculated using information in the position/frequency-of-occurrence table 114 to update the language likelihood in the speech recognition dictionary 113. In this way, this language likelihood is used in the next speech recognition. The sequence upon calculating the language likelihood will be described in detail below.

Figure 6:
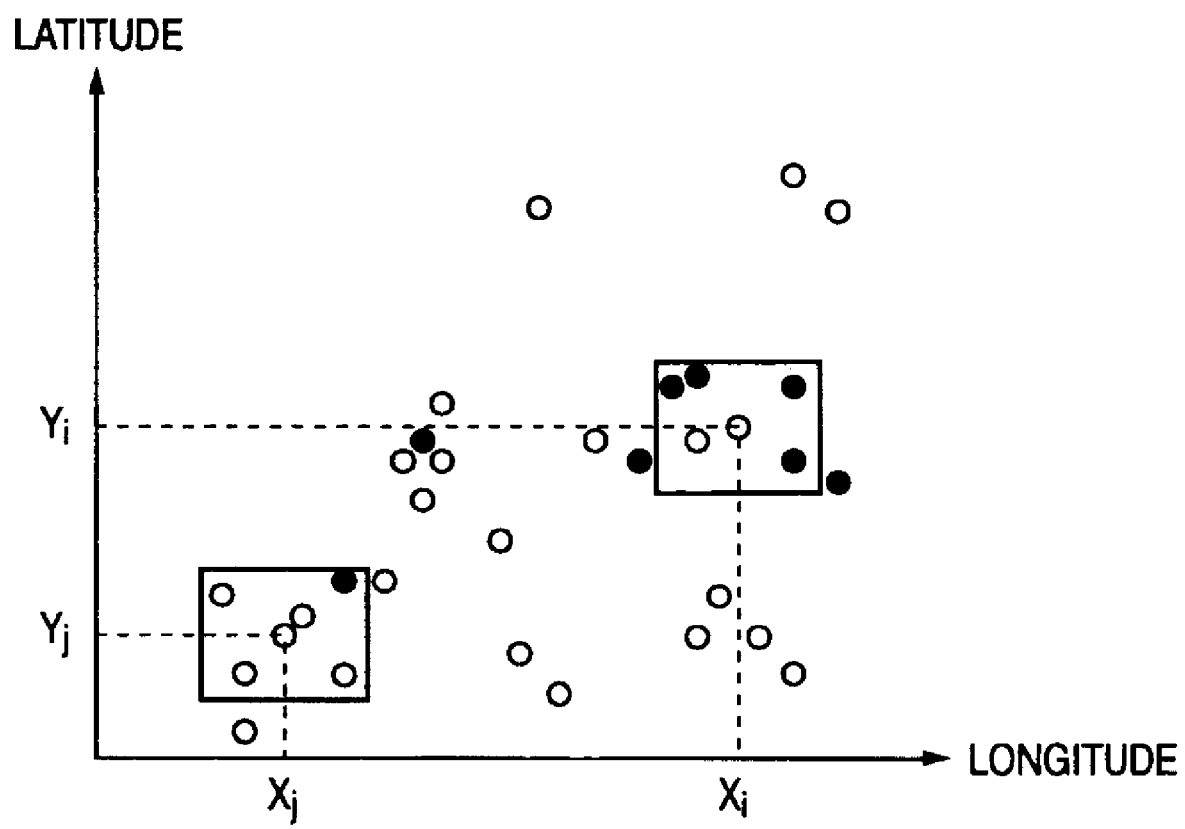
FIG. 6 is a graph for explaining the method of calculating weights for respective words.

FIG. 6 is a graph for explaining the method of calculating a weight for each word using the position/frequency-of-occurrence table 114 with the structure shown in FIG. 5.

In FIG. 6, the abscissa plots the longitude, and the ordinate plots the latitude. Hence, the coordinate position of each word ID is uniquely determined from the longitude and latitude in FIG. 5. Also, each white dot indicates a word with a small frequency of occurrence (three times or less) in FIG. 5, and each black dot indicates a word with a high frequency of occurrence (e.g., four times or more).

A method of calculating weights of two words, i.e., words i (longitude $X_i$, latitude $Y_i$) and j (longitude $X_j$, latitude $Y_j$) will be described below using FIGS. 7 to 9.

Geographical names to be recognized, which have positions within a predetermined region including the position of word i as a geographical name to be recognized (object of interest), are extracted for word i. After that, the weight is updated using the frequencies of occurrence of a word group with the extracted geographical names. For example, when weight $W_i$ for word i (longitude $X_i$, latitude $Y_i$) is to be updated, word group $u_i = \{u_1, u_2, \ldots, u_{Mi}\}$ included in a rectangular region which has a size $2R_X (X_i \pm R_X)$ in the longitude direction and $2R_Y (Y_i \pm R_Y)$ in the latitude direction ($M_i$ is the number of words included in this rectangular region) is extracted, and $W_i$ is mainly updated using the frequencies of occurrence of extracted words and the frequency of occurrence of word i by one of:

$$W_i = (1-\beta) \frac{\sum_{t=1}^{M_i} N_{u_i}}{M_i} + \beta N_i, \text{ if } M_i > 0 \quad (2)$$

$$W_i = N_i, \text{ if } M_i = 0 \quad (3)$$

where $N_{ut}$ is the frequency of occurrence of word $u_t$, $N_i$ is the frequency of occurrence of word i, and β is a weight (0<β<1).

Figure 7:
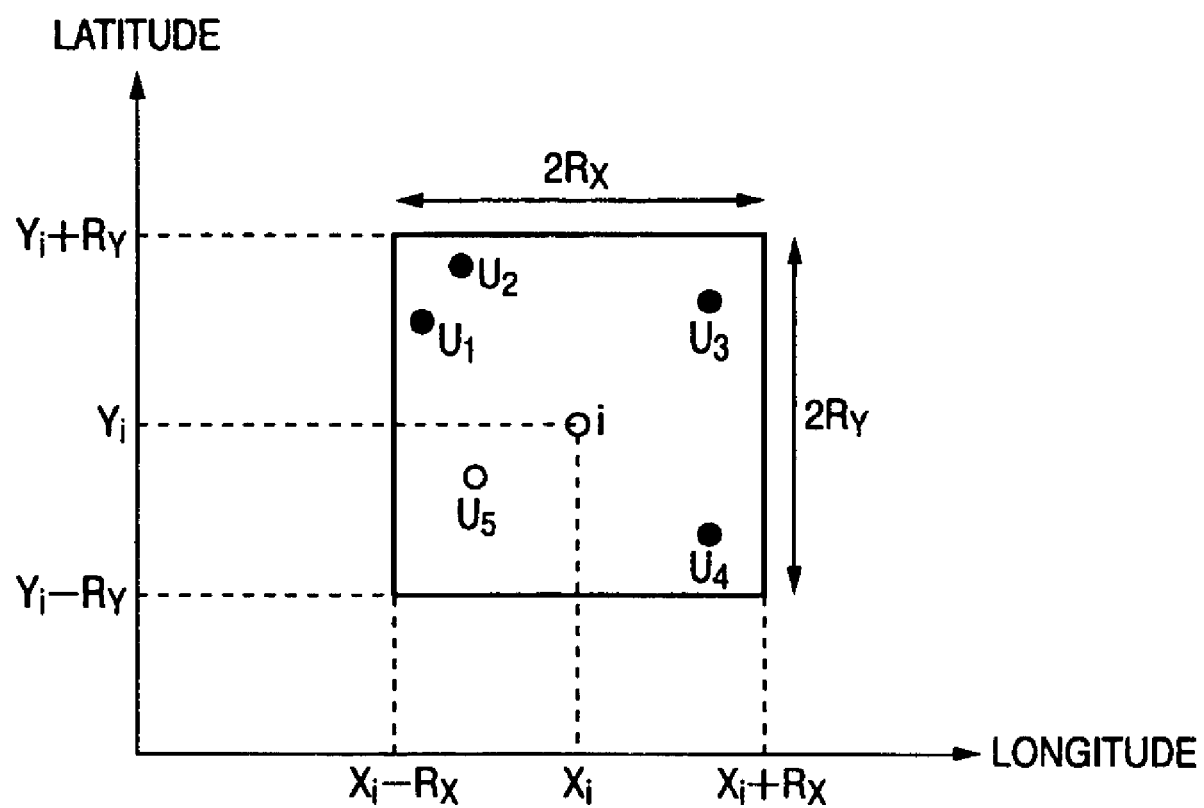
FIG. 7 is a graph showing an example of a rectangular region for word i and word group $u_i$ included in that rectangular region.

FIG. 7 shows an example of a rectangular region for word i and word group $u_i$ included in that rectangular region. In FIG. 7, $M_i$=5. Assume that $N_{ut}$ is the frequency of occurrence shown in FIG. 8 (i.e., $N_{u1}$=6, $N_{u2}$=8, $N_{u3}$=5, $N_{u4}$=3, $N_{u5}$=1, and $N_i$=1). Then, if β=0.5, weight $W_i$ of word i is calculated as $W_i$=3.0 from the above equation. Likewise, assume that a rectangular region for word j and word group $u_j$ included in that rectangular region are as shown in FIG. 9. Then, $M_j$=5, and when k=0.5, weight $W_j$ of word j is calculated as $W_j$=0.6.

Figure 8:
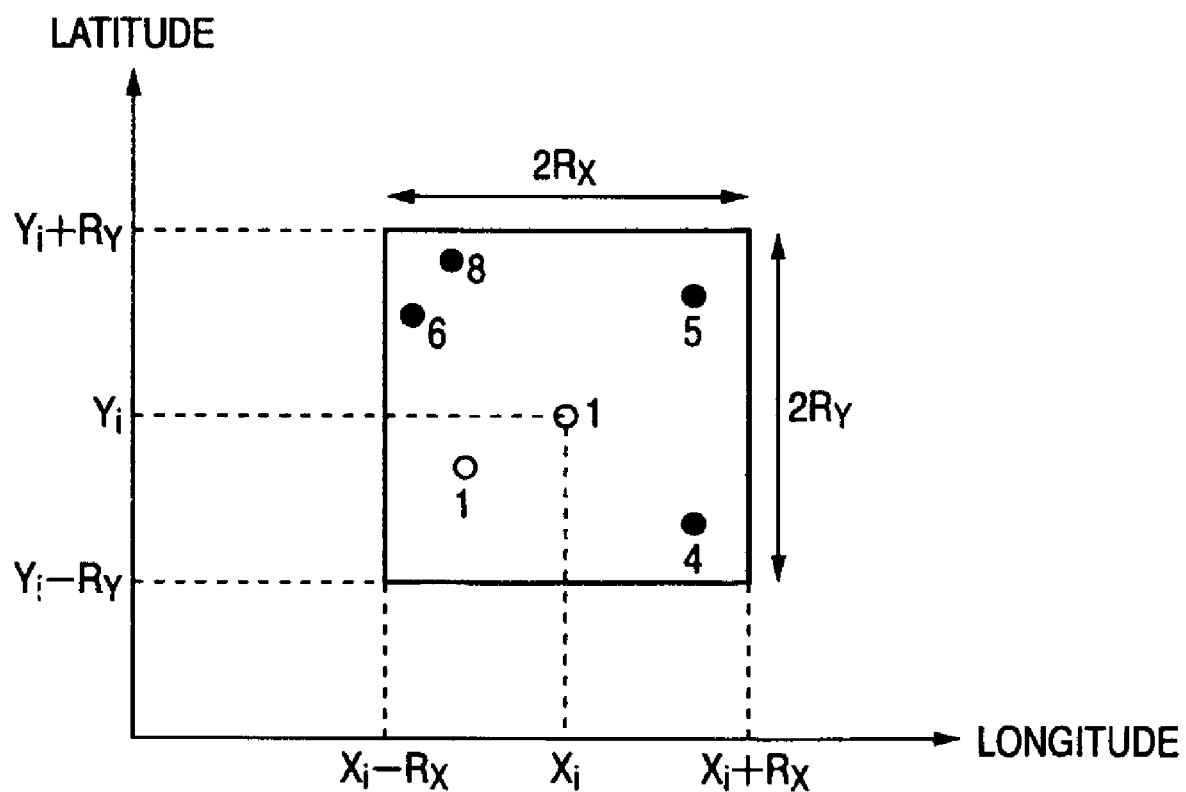
FIG. 8 is a graph showing an example of the frequency of occurrence of word group $u_i$ in the rectangular region for word i.
Figure 9:
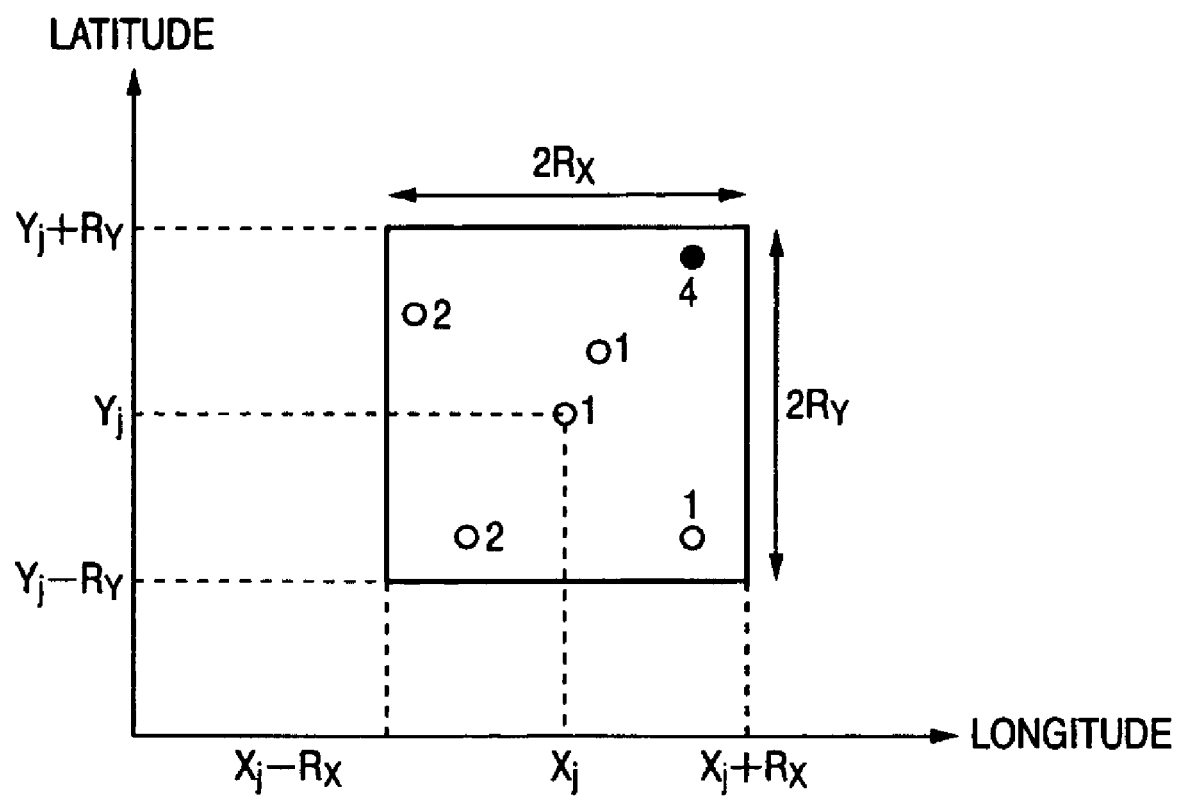
FIG. 9 is a graph showing an example of the frequency of occurrence of word group $u_j$ in a rectangular region for word j.

As can be seen from the example shown in FIGS. 8 and 9, although both words i and j have a frequency of occurrence=1, the frequencies of occurrence of the word group included in the rectangular region for word i are larger than those for word j. Hence, weight $W_i$ of word i is calculated as a larger value than weight $W_j$ of word j. The aforementioned calculations are made for all words to determine the weights of all the words. Furthermore, in order to set the average of the weights of all the words to be 1, weight $\overline{W}_k$ (k=1, ..., $L_w$) normalized using the weights of all the words is calculated by:

$$\overline{W}_k = \frac{W_k}{\sum_{i=1}^{L_W} W_i} \quad (4)$$

where $L_W$ is the total number of words to be recognized. This normalized weight is set as language probability $P=\overline{W}_k$, and the language likelihood is calculated from it as $L(k)=\log P(k)$.

As can be seen from the above description, according to this embodiment, the weights of respective words to be recognized can be calculated using the frequency-of-occurrence information of respective words to be recognized which were input previously, and position information associated with respective words to be recognized. As a result, by conducting speech recognition using these weights, the names of areas frequently input by the user are recognized more easily than those which are rarely input, and when the areas input by the user have a deviation, high recognition performance can be provided.

In the aforementioned embodiment, a rectangular region is used to determine a surrounding word group. However, the present invention is not limited to this, and regions of other shapes such as a circle and the like may be used.

In the aforementioned embodiment, a region of the same size ($2R_X$ in the longitude direction, $2R_Y$ in the latitude direction) is applied to each word. However, the present invention is not limited to this, and regions having different sizes for respective words may be used.

In the aforementioned embodiment, the frequencies of occurrence of a word group in the region are evenly handled to calculate the weight of the word of interest as in equations (2) and (3). However, the present invention is not limited to this, and the weight of the word of interest may be calculated using a weight according to the distance from the word of interest by:

$$W_i = (1-\beta)\frac{\sum_{t=1}^{M_i} D(i, u_t)N_{u_t}}{M_i \sum_{t=1}^{M_i} D(i, u_t)} + \beta N_i, \text{ if } M_i > 0 \quad (5)$$

Note that $D(i, u_t)$ is determined according to a predetermined function $F(d)$ in correspondence with distance $d(i, u_t)$ between the positions of words i and $u_t$. The function $F(d)$ is not particularly limited. For example, a function which increases D if d is small, and decreases D if d is large is preferably used.

Figure 10:
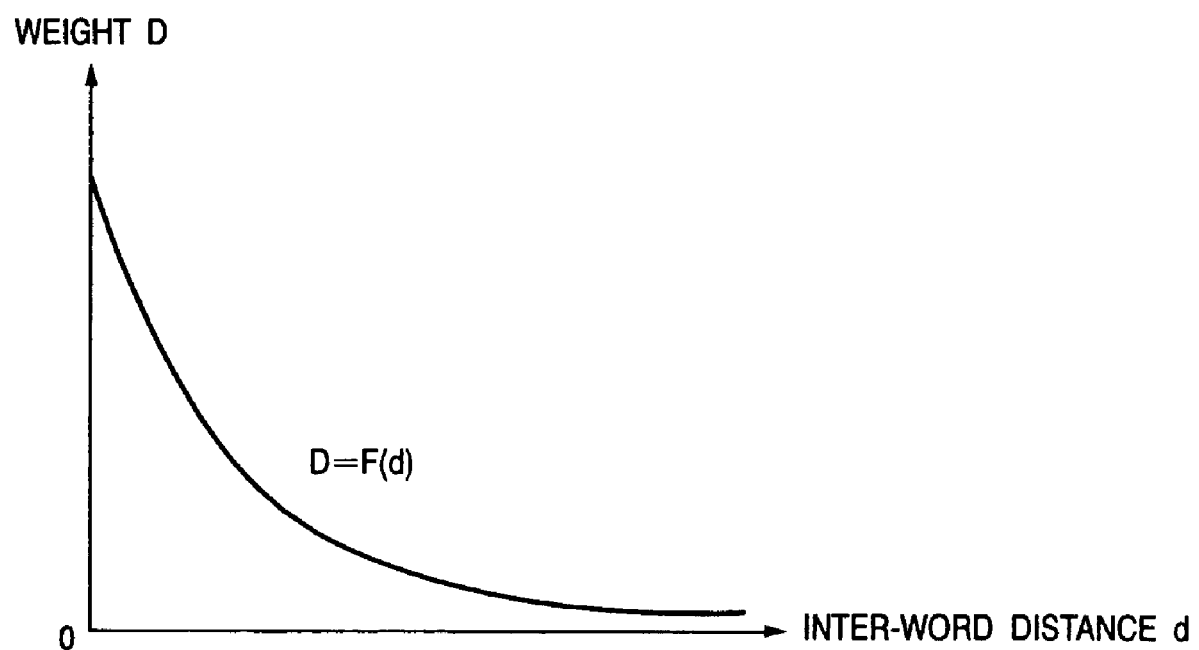
FIG. 10 is a graph showing an example of a function of determining weight D for inter-word distance d.

FIG. 10 shows an example of this function.

In the aforementioned embodiment, weights of the frequencies of occurrence of the word of interest and surrounding word group are respectively set as $\beta$ and $(1-\beta)$ in calculations. However, the present invention is not limited to this, and other weights may be used.

In the aforementioned embodiment, the frequency of occurrence is updated using the first recognition result. However, when the speech recognition apparatus can output a plurality of recognition results, the frequency of occurrence may be updated using these plurality of recognition results.

In the aforementioned embodiment, the longitude and latitude are used as the position information. The present invention is not limited to this, and other coordinate systems may be used as long as position information can be specified.

Figure 11:
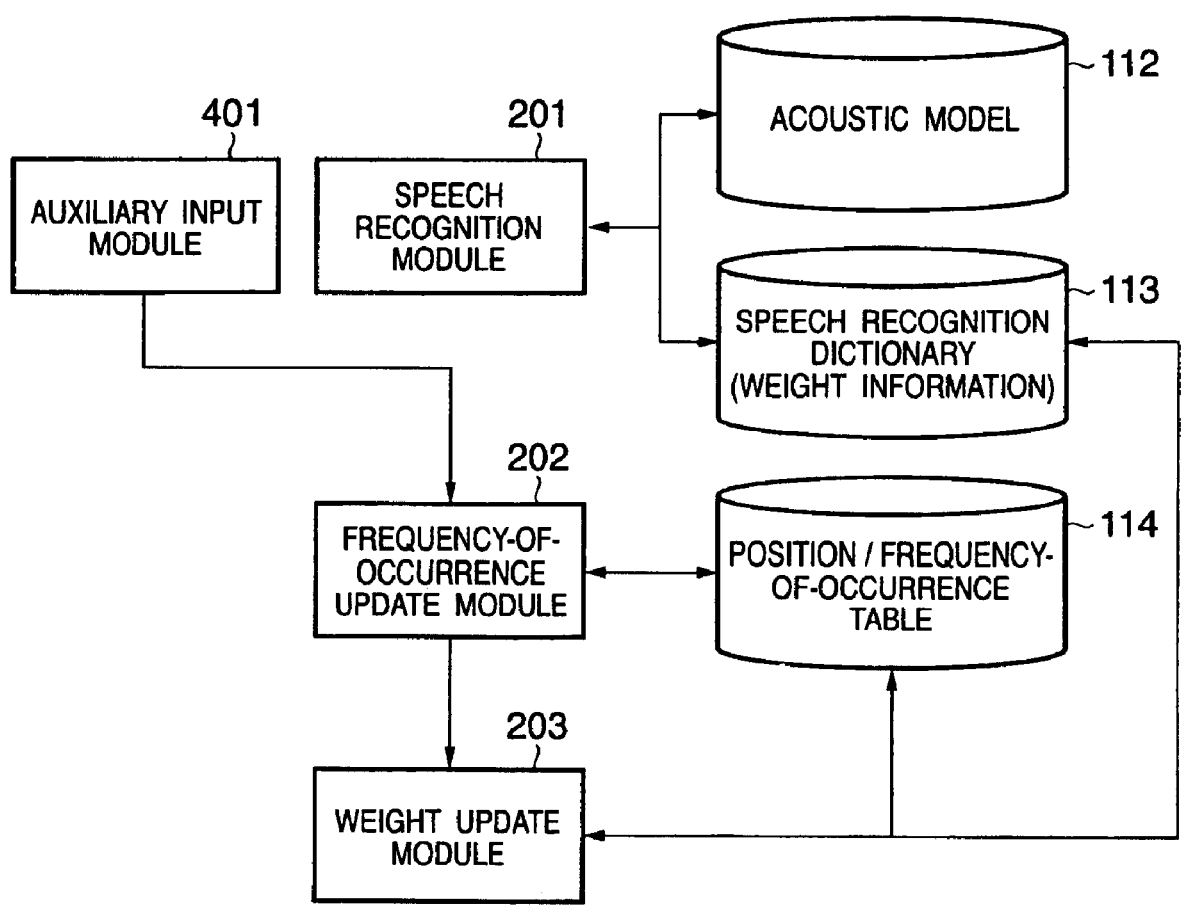

In the aforementioned embodiment, the frequency-of-occurrence information is updated based on the speech recognition history. However, the present invention is not limited to this, and the frequency-of-occurrence information and weight information may be updated using a history input using the auxiliary input/output device 107 which includes a keyboard, mouse, pen, and the like. FIG. 11 shows the module configuration of a speech recognition program which implements such process. In FIG. 11, reference numeral 401 denotes an auxiliary input module which makes inputs using the auxiliary input/output device 107. Other modules are the same as those in FIG. 2, except that the output from the auxiliary input unit 401 is input to the frequency-of-occurrence update unit 202 in place of that from the speech recognition module 201. In the present invention, the frequency-of-occurrence information and weight information may be updated further using the speech recognition history and auxiliary input history together.

In the aforementioned embodiment, one each language likelihood and frequency-of-occurrence information are provided for one word ID, as shown in FIGS. 4 and 5. However, the present invention is not limited to this, and a plurality of language likelihood values and a plurality of pieces of frequency-of-occurrence information may be held for one word ID. FIGS. 12 and 13 respectively show examples of the speech recognition dictionary 113 and position/frequency-of-occurrence table 114 when two types of language likelihood data and frequency-of-occurrence information. As a result, if the application that inputs the station names of departure and destination stations can acquire information indicating which of the departure and destination stations is input, language likelihood data and frequency-of-occurrence information are independently held for the departure and destination stations, thus considering areas frequently uttered upon inputting departure stations and those frequently uttered upon inputting destination stations.

Second Embodiment

In the first embodiment described above, the weight is determined using frequency-of-occurrence information alone. However, in general, high-profile names, which have high name recognition levels, are more likely to be uttered than low-profile names. Hence, this embodiment will explain a method of determining the weight on the basis of the name recognition levels of each word to be recognized as a prior probability of occurrence, and the frequency-of-occurrence information.

In this embodiment as well, the processes until equation (4) are the same as those explained in the first embodiment, and a description thereof will be omitted. Let $P_0(k)$ be the prior probability of occurrence of word k. Then, a language probability is calculated using this value and the normalized weight $\overline{W}_k$ given by equation (4) by $P(k)=(1-\gamma)\overline{W}_k-\gamma P_0(k)$. Note that the range of weight $\gamma$ is $0<\gamma<1$. Note that the prior probabilities of occurrence are determined beforehand for respective words on the basis of information such as the input frequencies of occurrence of many users, population, and the like.

As can be seen from the above description, according to this embodiment, the prior probabilities of occurrence of respective words to be recognized are considered in the weights of the words to be recognized, which are calculated using the frequency-of-occurrence information of previously input words to be recognized and the position information associated with the words to be recognized. In this way, even the names of areas which are rarely input by the user can be easily recognized if they are high-profile names.

Third Embodiment

In the first embodiment, the weight is updated using the position information associated with each word to be recognized. More specifically, a surrounding word group must be determined for each word to update its weight, and when a weight according to the distances between the word of interest and surrounding word group is to be applied, inter-word distances must be calculated. This embodiment will explain a method that can skip the process for calculating the surrounding word group or inter-word distances upon updating weights by calculating the inter-word distances in advance.

If the position information of each word to be recognized is known, a word set of surrounding words with respect to the word of interest in an arbitrary region such as a rectangular region, circular region, or the like mentioned above can be obtained in advance as a surrounding word group table. FIG. 14 shows an example of the surrounding word group table. In this example, the table holds the number of words present in the surrounding region and word IDs of these words in association with each word ID. If a table that holds the information of this table in place of the longitude information and latitude-information in FIG. 5 is used as the position/frequency-of-occurrence table 114, the determination process of a word group within the region required in the calculations of equation (1) can be implemented by simple table lookup.

FIG. 15 shows an example of a surrounding word group table when the surrounding word group table in FIG. 14 holds distance information between the word of interest and each surrounding word together. If a table that holds the information of this table in place of the longitude information and latitude information in FIG. 5 is used as the position/frequency-of-occurrence table 114, the determination process of a word group within the region and the calculation process of inter-word distances required in the calculations of equation (4) can be implemented by simple table lookup, if the surrounding region is a circular region.

The process using the table shown in FIG. 14 or 15 can be applied only when a region where surrounding words are to be obtained is determined in advance. More specifically, this process can be applied when $2R_X$ and $2R_Y$ in the rectangular region and the radius in the circular region are constant irrespective of updated frequencies of occurrences and weights. If these regions change, surrounding word groups included in the regions change in correspondence with changes in region. In such case, a distance table between all words shown in FIG. 16 may be used. If the surrounding region is a rectangular region and each weight is calculated using equation (4), whether or not each word is included in the region cannot be determined by only the inter-word distance. Hence, the longitude information and latitude information must be held in addition to the information in FIG. 16.

Figures 17A, 17B:
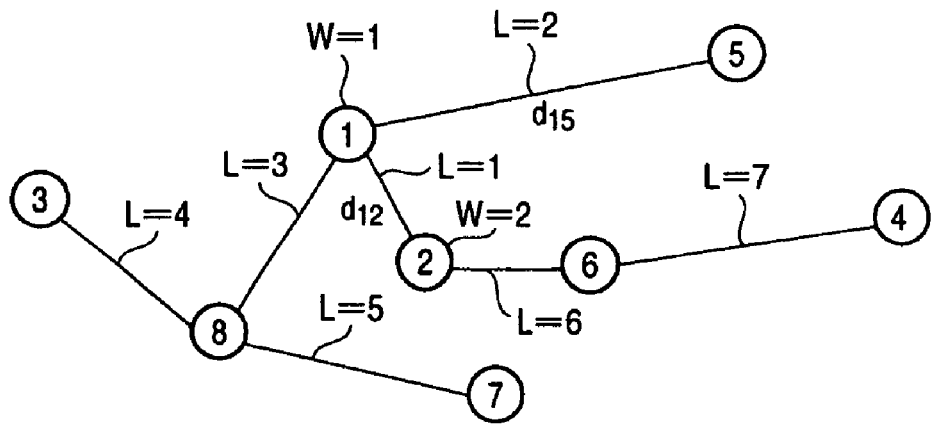
FIGS. 17A and 17B show an example of the graph expression of inter-word distances.

When the distances between all words are held as a table, as shown in FIG. 16, the table size becomes huge, thus posing another problem. As a method of solving such problem, as shown in FIGS. 17A and 17B, graph expression may be used: words are considered as nodes, and neighboring words are connected via links, which hold inter-word distances. FIG. 17A is a schematic view of such graph expression, and FIG. 17B shows an example of internal data expression. In FIG. 17B, W is node information, to which a word ID is assigned. L is a link index, and S and E are node numbers to which that link is connected. In this example, a smaller node number is assigned to S, and a larger node number is assigned to E. Also, d is the link length, i.e., the inter-word distance. Using this graph data, the distance between non-neighboring words, i.e., the distance between words 1 and 3, can be calculated by approximation as the total distance of links, i.e., the sum total of the distances of L=3 and L=4, that is, d=25.0+20.0=45.0. Using such approximate distance, the data size can be greatly reduced compared to the table with the structure shown in FIG. 16, and all inter-word distances can be considered. If a plurality of paths are present upon calculating the inter-word distance, the total distance obtained from the path with the smallest distance is adopted as the inter-word distance.

Fourth Embodiment

In the embodiments described so far, the distance is explained as a slant distance between two spatial points such as the longitudes, latitudes, and the like. However, the present invention is not limited to this, and an arbitrary physical quantity may be defined as a distance. For example, the length of a rail track between two stations, the distance of an arterial road between two cities, the time required to travel between two points, and the like may be defined as the distance.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-415425 filed Dec. 12, 2003, which is hereby incorporated by reference herein.

What is claimed is:

1. A method for performing speech recognition of geographical names using a weighting factor associated with respective geographical names to be speech recognized, the method comprising:
   a speech recognition step of performing speech recognition in which likelihood values of entered speech for each recognition target geographical name are calculated, wherein each likelihood value is weighted by a weighting factor corresponding to a recognition target geographical name;
   a determination step of determining a geographical name having a maximum likelihood value as a speech recognition result;
   a frequency-of-occurrence update step of updating frequency of occurrence information of the geographical name obtained by the determination step, wherein the frequency of occurrence information indicates the number of times that the geographical name has been determined as a speech recognition result in the determination step;
   a first obtaining step of obtaining a position of the geographical name from a table that describes correspondence between geographical names to be speech recognized and their geographical positions;
   a region determination step of determining a region centered on the position of the geographical name;
   an extraction step of extracting geographical names to be speech recognized located within the region on the basis of the table;
   a frequency-of-occurrence obtaining step of obtaining the frequency of occurrence information of the extracted geographical names;
   a second obtaining step of obtaining positions of the extracted geographical names;
   a distance factor determination step of determining distance factors based on distances between the position of the geographical name obtained in the first obtaining step and the positions of the extracted geographical names obtained in the second obtaining step; and
   a weighting factor update step of updating the weighting factor associated with the geographical name determined as the speech recognition result in the determination step by using the updated frequency of occurrence information of the geographical name obtained in the frequency-of-occurrence update step, the frequency of occurrence information of the extracted geographical names obtained in the frequency-of-occurrence obtaining step, and the distance factors determined in the distance factor determination step,
   wherein the updated weighting factor is used in the next speech recognition step.

2. A computer-readable storage medium storing a computer program for performing speech recognition of geographical names using a weighting factor associated with respective geographical names to be speech recognized, the computer program comprising:
   code for a speech recognition step of performing speech recognition in which likelihood values of entered speech for each recognition target geographical name are calculated, wherein each likelihood value is weighted by a weighting factor corresponding to a recognition target geographical name;
   code for a determination step of determining a geographical name having a maximum likelihood value as a speech recognition result;
   code for a frequency-of-occurrence update step of updating frequency of occurrence information of the geographical name obtained by the code for the determination step, wherein the frequency of occurrence information indicates the number of times that the geographical name has been determined as a speech recognition result in the code for the determination step;
   code for a first obtaining step of obtaining a position of the geographical name from a table that describes correspondence between geographical names to be speech recognized and their geographical positions;
   code for a region determination step of determining a region centered on the position of the geographical name;
   code for an extraction step of extracting geographical names to be speech recognized located within a region on the basis of the table;
   code for a frequency-of-occurrence obtaining step of obtaining the frequency of occurrence information of the extracted geographical names;
   code for a second obtaining step of obtaining positions of the extracted geographical names;
   code for a distance factor determination step of determining distance factors based on distances between the position of the geographical name obtained in the code for the first obtaining step and the positions of the extracted geographical names obtained in the code for the second obtaining step; and
   code for a weighting factor update step of updating the weighting factor associated with the geographical name determined as the speech recognition result in the code for the determination step by using the updated frequency of occurrence information of the geographical name obtained in the code for the frequency-of-occurrence update step, the frequency of occurrence information of the extracted geographical names obtained in the code for the frequency-of-occurrence obtaining step, and the distance factors determined in the code for the distance factor determination step, wherein the updated weighting factor is used in the code for the next speech recognition step.

3. A speech recognition apparatus for performing speech recognition of geographical names using a weighting factor associated with respective geographical names to be speech recognized, the apparatus comprising:
- a speech recognition means for performing speech recognition in which likelihood values of entered speech for each recognition target geographical name are calculated, wherein each likelihood value is weighted by a weighting factor corresponding to a recognition target geographical name;
- a determination means for determining a geographical name having a maximum likelihood value as a speech recognition result;
- a frequency-of-occurrence update means for updating frequency of occurrence information of the geographical name obtained by the determination means, wherein the frequency of occurrence information indicates the number of times that the geographical name has been determined as a speech recognition result in the determination means;
- a first obtaining means for obtaining a position of the geographical name from a table that describes correspondence between geographical names to be speech recognized and their geographical positions;
- a region determination means for determining a region centered on the position of the geographical name;
- an extracting means for extracting geographical names to be speech recognized located within a region on the basis of the table;
- a frequency-of-occurrence obtaining means for obtaining the frequency of occurrence information of the extracted geographical names;
- a second obtaining means for obtaining positions of the extracted geographical names;
- a distance factor determination means for determining distance factors based on distances between the position of the geographical name obtained by the first obtaining means and the positions of the extracted geographical names obtained by the second obtaining means; and
- a weighting factor update means for updating the weighting factor associated with the geographical name determined as the speech recognition result by the determination means by using the updated frequency of occurrence information of the geographical name obtained by the frequency-of-occurrence update means, the frequency of occurrence information of the extracted geographical names obtained by the frequency-of-occurrence obtaining means, and the distance factors determined by the distance factor determination step, wherein the updated weighting factor is used by the next speech recognition means.

* * * * *